United States Patent

[11] 3,552,418

| [72] | Inventor | James D. Kress<br>St. Paul, Minn. |
|---|---|---|
| [21] | Appl. No. | 758,400 |
| [22] | Filed | Sept. 9, 1968 |
| [45] | Patented | Jan. 5, 1971 |
| [73] | Assignee | Economics Laboratory, Inc.<br>St. Paul, Minn.<br>a corporation of Delaware |

[54] PROPORTIONAL METERING APPARATUS
7 Claims, 4 Drawing Figs.

[52] U.S. Cl. ................................................... 137/101.21,
73/194
[51] Int. Cl. ................................................... G05d 11/035,
G05d 11/13
[50] Field of Search .......................................... 137/101.21;
73/229, 230, 231, 194M

[56] References Cited
UNITED STATES PATENTS

| 2,732,069 | 1/1956 | Henderson | 137/101.21 |
| 3,038,486 | 6/1962 | Thurman | 137/101.21X |
| 3,216,434 | 11/1965 | Lovendahl | 137/101.21X |
| 3,230,767 | 1/1966 | Heigl et al. | 73/229X |
| 3,453,538 | 7/1969 | Wright et al. | 73/231X |

*Primary Examiner*—Robert G. Nilson
*Attorney*—Merchant & Gould

ABSTRACT: A disc mounted in a stream of fluid for rotation at a rate proportional to the rate of flow of the fluid and constructed to interrupt a light beam at least once per revolution to provide a series of pulses which are utilized to time an injection motor so that a material is introduced into the stream in an amount proportional to the rate of flow of the fluid in the stream.

PATENTED JAN 5 1971
3,552,418
SHEET 1 OF 2
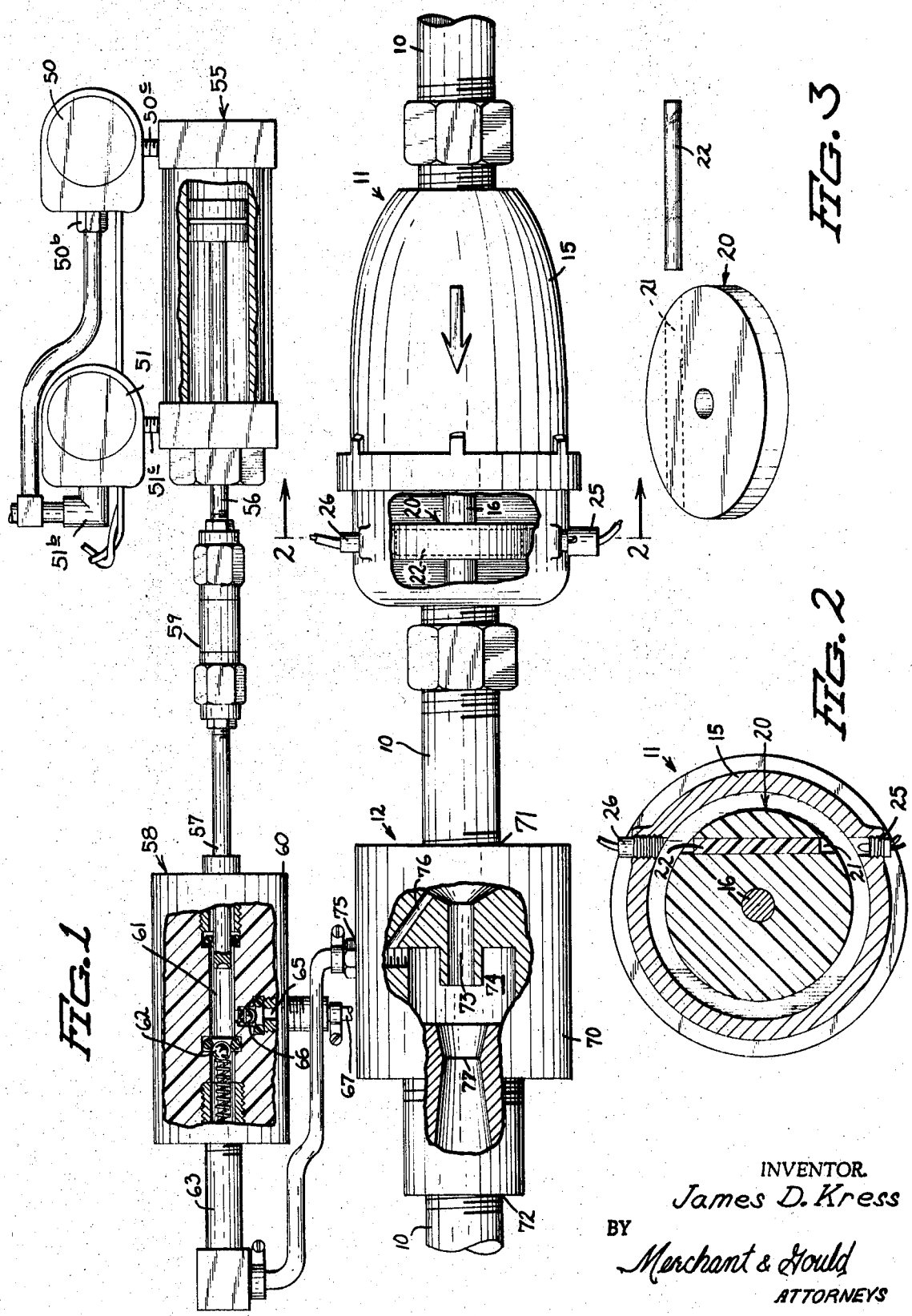
INVENTOR.
James D. Kress
BY
Merchant & Gould
ATTORNEYS

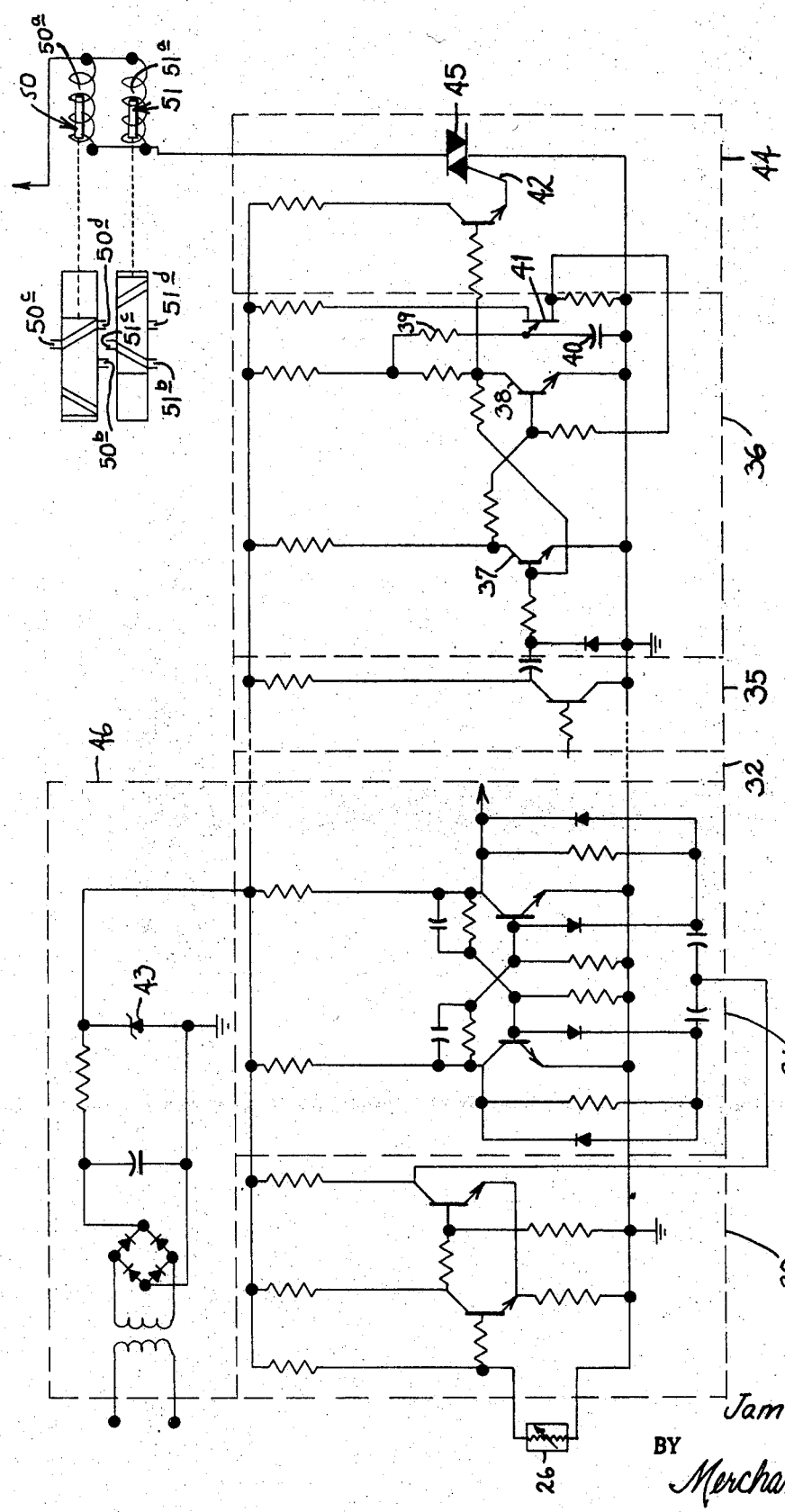

3,552,418

PROPORTIONAL METERING APPARATUS

BACKGROUND OF THE INVENTION

1. Field of the Invention

Apparatus for altering the properties of a fluid by adding proportions of a modifying material to the fluid prior to the use thereof are widely used at the present time. Some examples of such uses are: introducing small amounts of detergent to a stream of water; introducing small amounts of brines or process chemicals to a stream of water to produce a dilute solution; introducing liquid food concentrates and/or syrups in the preparation of a food or drink for consumers; etc.

2. Description of the Prior Art

In the prior art a velocity meter is mounted so that the fluid stream flows through the meter and causes movement of a member therein. The member is connected mechanically so that the movement thereof opens and closes sets of valves to operate a driving cylinder attached to a reciprocating plunger or pump. The reciprocating plunger or pump is connected to draw fluid from a supply and inject a small amount into the stream. One of the major difficulties with these prior art devices lies in the mechanical connection of the velocity meter to the valve system. As the rate of flow of the fluid in the stream is reduced the movement of the velocity meter becomes less active, so that the proportionality thereof is very poor over a wide range of flow rates. Further, because of the number of moving parts there is a great tendency towards wearing and eventual failure.

SUMMARY OF THE INVENTION

This invention pertains to proportional metering apparatus including means responsive to the rate of flow of a stream of fluid providing a variable signal, an injection pump having an inlet and an outlet one of which is in communication with the stream of fluid, electronic circuitry connected to receive said variable signal and control said injection pump at a rate substantially proportional to the rate of flow of said fluid.

It is an object of the present invention to provide a new and improved proportional metering apparatus.

It is a further object of the present invention to provide a proportional metering apparatus wherein the means responsive to the rate of flow of a stream of fluid is connected to a metering device by some means other than mechanical so that there is little or no variation in the external forces on the responsive means as the rate of flow varies.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is a view of the proportional metering apparatus operatively attached in a fluid stream, portions thereof broken away and shown in section;

FIG. 2 is a sectional view as seen from the line 2—2 in FIG. 1;

FIG. 3 is an exploded view in perspective of the sensing disc and

FIG. 4 is a schematic diagram of the electronics associated with the apparatus illustrated in FIG. 1.

DESCRIPTION OF THE PREFERRED EMBODIMENT

In the FIGS. a fluid stream is illustrated in the form of a conduit 10 interrupted by a fluid flow detector generally designated 11 and a diffuser generally designated 12. The conduit 10 is broken away at both ends so that the inlet and outlet thereof are not shown but the flow of fluid will occur generally from right to left in FIG. 1. It should be understood, however, that it is not necessary to contain the fluid within a conduit and the present apparatus will operate in substantially any fluid stream in which the fluid flow detector 11 will operate. Further, the direction of fluid in the fluid stream is not critical and, assuming that the various components will operate correctly, the fluid flow in the conduit 10 might be from left to right in FIG. 1.

Referring specifically to the fluid flow detector 11, a housing 15 is connected to the conduit 10 at either end thereof so that fluid flowing in the conduit 10 flows through the housing 15 from one end to the other. A shaft 16 is rotatably mounted within the housing 15 so as to extend generally parallel with the flow of fluid therethrough. The shaft 16 has means (not shown) attached thereto for causing rotation thereof generally proportional to the flow of fluid thereby. The means causing rotation may include any of the various types of vanes or the like utilized in water meters and other fluid flow apparatus presently available on the market.

A sensing disc 20 is attached to the shaft 16 for rotation therewith. The sensing disc 20 is formed of an opaque material and is positioned within the housing 15 so that fluid flowing therethrough can easily flow around the sensing disc 20. A hole 21 is formed through the sensing disc 20 so as to be off center but generally in the plane thereof. A transparent rod 22 having an outer diameter equal to the inner diameter of the hole 21 is immovably positioned within the hole 21. The ends of the rod 22 are generally parallel and the length is such that the rod does not extend outwardly from either end of the hole 21. The rod 22 may be formed of any of the well-known light transmitting plastics presently available while the sensing disc 20 may be formed of an opaque plastic. The rod 22 is placed in the hole in the disc 20 to enhance the transmission of light therethrough (turbulent fluid may be a poor light conductor) and to reduce turbulence in the fluid within the housing 15 (relative to an open hole through the disc 20).

An electric lamp 25 is mounted in the housing 15 generally in the plane of the disc 20 so as to transmit a beam of light onto the disc 20 generally perpendicular to the shaft 16 but to one side thereof. A light sensitive device 26 is mounted in the housing 15 generally in the plane of the sensing disc 20 but spaced from the lamp 25. The lamp 25, sensing disc 20 and light sensitive device 26 are all mounted so that once each revolution of the sensing disc 20 the lamp 25, rod 22 and light sensitive device 26 are aligned. Thus, once each revolution of the sensing disc 20 light is transmitted from the lamp 25, through the rod 22, to the light sensitive device 26 and pulses of electric energy are produced the repetition rate of which is proportional to the rate of flow of fluid through the housing 15.

It should be understood that substantially any type of electromagnetic wave which can be interrupted and sensed or magnetic type pickups might be utilized in conjunction with the fluid flow detector 11 in lieu of the sensing disc 20, lamp 25 and light sensitive device 26. Also, while the illustrated rod 22 is positioned along a chord of the sensing disc 20 it should be understood that it might be positioned parallel with the shaft 16 by redesigning the housing 15.

Referring to FIG. 4, the light sensitive device 26 is connected in the base circuit of a Schmitt trigger 30. The Schmitt trigger, as is well known in the art, is a regenerative circuit which produces a substantially square wave output from a sinusoidal or generally sinusoidal input. The variation of the resistance in the base circuit of the Schmitt trigger 30 caused by light from the lamp 25 striking the light sensitive device once each revolution of the sensing disc 20, causes the Schmitt trigger to provide a generally square pulse at the output thereof. The output pulse of the Schmitt trigger 30 is applied to a bistable multivibrator or counting flip-flop 31. Bistable multivibrator 31 is symmetrically constructed so that the first pulse applied thereto from the Schmitt trigger 30 causes one of the transistors to conduct and the other to be cut off and the second pulse applied thereto by the Schmitt trigger 30 causes the first transistor to be cut off and the second transistor to conduct whereby a pulse is produced at the output thereof. Thus, one pulse is produced at the output of the bistable multivibrator 31 for each two pulses supplied at the input by the Schmitt trigger 30. In a similar fashion a block 32 is provided having n-stages of bistable multivibrators similar to the bistable multivibrator 31 and connected in series thereto. Thus, since each bistable multivibrator divides the input by two, one bistable multivibrator 31 produces an output pulse for every two pulses from the Schmitt trigger 30, two multivibrators in series produce an output pulse for each four pulses provided by the Schmitt trigger 30, three bistable multivibrators in series produce an output pulse for each eight pulses provided by the Schmitt trigger 30, etc. As will be seen presently, the bistable multivibrator 31 and any additional multivibrators in the block 32 can be utilized as a course adjustment for reducing the proportionality of the present system. It should be understood that when a one-to-one ratio is desired both the bistable multivibrator 31 and the block 32 are removed from the circuit and the output of the Schmitt trigger 30 is supplied directly to the next component.

The next component, an isolation inverter 35, receives the output from either the n-stages of multivibrator in block 32, the bistable multivibrator 31 or the Schmitt trigger 30 and prevents loading of the prior circuits. The isolation inverter 35 is, as the name implies, simply a circuit which is utilized in the present embodiment to connect the particular circuits selected for the system. It should be understood that each of the circuits described herein were selected for the ease of implementation and reliability and many other circuits might be utilized which are modifications of the present circuits or different therefrom.

The output of the isolation inverter is connected to the input of a unijunction timing multivibrator 36. The unijunction timing multivibrator 36 includes a generally standard bistable multivibrator with a first transistor 37 and a second transistor 38 connected so that the first transistor 37 receives the output of the isolation inverter 35. The second transistor 38 has a resistor 39 and a capacitor 40 connected in series from the collector circuits thereof to ground. The emitter of a unijunction transistor 41 is connected to the junction of the resistor 39 and the capacitor 40i base 1 of the unijunction transistor 41 is connected through a resistor to ground and base 2 is connected through a resistor to a voltage source. Also, base 1 of the unijunction transistor 41 is connected through a resistor to the base of the second transistor 38. When a pulse is received on the base of the first transistor 37 the transistor begins to conduct and the second transistor 38 approaches a cutoff state. As the conduction of the second transistor 38 is reduced the collector voltage rises and, thus, the voltage across the resistor 39 and capacitor 40 rises. As the capacitor 40 charges towards the higher voltage, the voltage at the emitter of the unijunction transistor 41 rises until the turn-on point is reached. At this time the capacitor 40 discharges through the unijunction transistor 41 and a pulse is supplied to the base of the second transistor 38. The multivibrator 36 then switches back to its original state. The length of time required for the timing multivibrator 36 to complete a full cycle or pulse is dictated by the values of the resistor 39 and capacitor 40. In the present embodiment a pulse produced at the output of the timing multivibrator 36 is approximately 100 milliseconds in duration and typical values for the resistor 39 and capacitor 40 are, 240K ohms and 0.1 microfarad, respectively.

The pulse from the timing multivibrator 36 is applied to an AC power amplifier 44 including a triac or triode AC semiconductor switch 45. The triac 45 is controlled by a gate 42 which receives the output pulse of the timing multivibrator 36 thereon. The triac 45 allows AC current to flow therethrough during the time that the pulse is prevelent on gate 42. All of the electronic circuits described receive DC power from a DC power supply 46 which includes a standard full wave rectifying bridge and a Zener diode 43 included therein for regulation.

Two air solenoids 50 and 51 are connected in parallel and the parallel connection is connected in series with the triac 45 so that the flow of AC current therethrough is controlled by conduction of the triac 45. Each of the air solenoids 50 and 51 includes an AC coil and plunger unit 50a and 51a, respectively, and an attached valve having inlets 50b and 51b, outlets 50c and 51c and exhaust ports 50d and 51d. The valves each further include a bobbin having a first position wherein the inlet and outlet are connected and the exhaust port is closed and a second position wherein the outlet and exhaust port are connected and the inlet is closed. In the present embodiment the air solenoids 50 and 51 are connected so that the bobbins are always in the opposite position. That is, when the bobbin of the air solenoid 50 is in a position to connect the exhaust port 50d to the outlet 50 c the bobbin of the air solenoid 51 is in a position to connect the inlet 51b to the outlet 51c and vice versa. Since the coils 50a and 51a are connected in parallel, whenever a pulse is applied to the gate 42 of the triac 45 both bobbins of the air solenoids 50 and 51 change position simultaneously.

Referring to FIG. 1, the outlet 50c of the air solenoid 50 is connected to the right end of a double-acting piston 55 and the outlet 51c of the air solenoid 51 is connected to the left end of the double-acting piston 55. The inlets 50b and 51b of the air solenoids 50 and 51 are connected to a source of air pressure which is sufficient to operate the double-acting piston 55. Thus, since the bobbins of one of the air solenoids 50 or 51 is always in a position to supply air to the double-acting piston 55 and since each pulse supplied to the gate 42 of the triac 45 causes the bobbins of the air solenoids 50 and 51 to change positions, every other pulse supplied to the triac 45 causes the double-acting piston 55 to travel a complete stroke in one direction. The alternate pulses then cause the double-acting piston to travel a complete stroke in the opposite direction. In general the timing circuit (resistor 39 and capacitor 40) should be selected to provide a sufficiently long pulse at the gate 42 of the triac 45 so that both of the air solenoids 50 and 51 and the double-acting piston 55 have enough time to complete a stroke but the time should not be too long or the upper limits of the system will be greatly lowered.

A connecting rod 56 of the double-acting piston 55 is connected to a piston 57 of an injection pump 58 by a capacity adjusting device 59. The piston 57 and the connecting rod 56 are attached together generally coaxially and the capacity adjusting device 59 is simply a threaded connector which adjusts the position of the piston 57 relative to the injection pump 58 and, thus, the length of the stroke of the piston 57 within the injection pump 58. The injection pump 58 further includes a housing 60 having a bore 61 therethrough with the piston 57 mounted therein for coaxial reciprocating movements adjacent one end. A check valve 62 is mounted adjacent the other end of the bore 61 and an outlet conduit 63 is attached to receive fluid from that end. An inlet bore 65 is formed in the housing 60 approximately at the midpoint of the bore 61 and generally perpendicular thereto. A check valve 66 is positioned in the inlet bore 65 so as to allow fluid to enter the bore 61 through the inlet bore 65 but not to egress therethrough. The inlet bore 65 has an inlet conduit 67 attached thereto and in communication with a source of fluid to be injected into the conduit 10. While the described injection pump 58 is utilized for fluid and the like it should be understood that other metering means might be utilized for other types of material, such as dry material, powders, and the like. In the operation of the injection pump 58 the double-acting piston 55 draws the piston 57 away from the check valve 62 and the inlet bore 65. The outward movement of the piston 57 draws fluid into the bore 61 from the inlet bore 65 and the check valve 66 retains the fluid in the bore 61. The next stroke of the double-acting piston 55 forces the piston 57 toward the check valve 62 which allows the fluid to flow from the bore 61 into the outlet conduit 63.

The diffuser 12 includes a housing 70 having an inlet opening 71 at one end thereof and an outlet opening 72 at the other end thereof. The openings 71 and 72 are threaded to receive the conduit 10 threadedly engaged therein. In this embodiment the opening 71 is in communication with one end of a constricted passageway 73 in the central portion of the housing 70 and an enlarged cylindrical mixing chamber 74 is positioned within the housing 70 at the other end thereof. The outlet conduit 63 from the injection pump 58 is threadedly engaged in an opening 75 in the housing 70 which communicates with the mixing chamber 74. A passageway 76, which is small relative to the constricted passageway 73, extends from the inlet opening 71 to the opening 75 to forcibly mix a small amount of fluid from the conduit 10 with the incoming material or fluid from the pump 58. Thus, the two fluids or materials are premixed in the mixing chamber 74. A slightly constricted throat 77 is positioned in the housing 70 in communication with the outlet opening 72 and generally coaxial with but spaced from the constricted passageway 73. The constricted passageway 73 and the throat 77 form an aspirator which thoroughly mixes the material or fluid from the pump 58 with the fluid flowing in the conduit 10. Further, because the mixing chamber 74 acts as a constant reservoir of premixed fluids or materials, there is no pulsing effect from the pump 58, or variations in concentration of the mixture.

Thus, a proportional metering apparatus is described which includes a fluid flow detector that provides a signal with a variable parameter, in this embodiment a series of pulses with a variable repetition rate, which parameter varies in accordance with the rate of flow of fluid through the fluid flow detector. The apparatus further includes electronics for receiving the signal from the fluid flow detector and processing said signal to operate a prime mover (in this embodiment the double-acting piston 55). The electronics also includes circuitry for changing the proportionality of the signal (this circuitry may be considered a course adjustment) supplied by the fluid flow detector and applied to the prime mover. The apparatus further includes a metering device, such as an injection pump, which is operated by the prime mover and has associated therewith a fine adjustment for varying the proportionality of the amount of material injected into the main flow each time the prime mover is activated.

I claim:

1. Proportional metering apparatus for introducing a material into a flow of fluid comprising:
   a. a metering device having an inlet in communication with a source of said material and an outlet in communication with said flow of fluid;
   b. a prime mover operatively attached to said metering device having means incorporated therewith for electrically controlling said prime mover;
   c. a fluid flow detector for providing an energy field having at least one parameter varying approximately in proportion to the rate of flow of said fluid and having means incorporated therewith responsive to said varying parameter of said energy field for generating a corresponding electric signal having a pulse repetition rate varying approximately in proportion to said varying parameter of said energy field; and
   d. electronic circuitry sensitive to variations in said pulse repetition rate of said electric signal including pulse timing means for providing a predetermined pulse duration for said electric signal and having an input connected to receive said electric signal from said responsive means of said fluid flow detector and an output connected to said electrical controlling means of said prime mover for causing said prime mover to operate said metering device so as to introduce the material into the flow of fluid at a rate substantially proportional to the rate of flow of said fluid.

2. The apparatus set forth in claim 1 wherein the pulse timing means of said electronic circuitry includes at least one bistable multivibrator for providing a lesser number of output pulses than pulses received from said responsive means of said fluid flow detector.

3. The apparatus set forth in claim 1 wherein said energy field is an electromagnetic wave and said energy field responsive means of said fluid flow detector is sensitive to said electromagnetic wave.

4. Proportional metering apparatus for introducing a material into a flow of fluid comprising:
   a. a metering device having an inlet in communication with a source of said material and an outlet in communication with said flow of fluid;
   b. a prime mover operatively attached to said metering device having means incorporated therewith for electrically controlling said prime mover;
   c. a fluid flow detector including:
      1. means for generating an energy field having at least one variable parameter;
      2. a moveable member positioned in said fluid flow and mounted for rotational movement so as to vary said one variable parameter of said energy field approximately proportional to the rate of flow of said fluid; and
      3. means responsive to said varying parameter of said energy field for generating a corresponding electric signal having at least one parameter varying approximately in proportion to said varying parameter of said energy field; and
   d. electronic circuitry sensitive to variations of said one electrical signal parameter having an input connected to receive said electric signal from said responsive means of said fluid flow detector and an output connected to the electrical controlling means of said prime mover for causing said prime mover to operate said metering device so as to introduce the material into the flow of fluid at a rate substantially proportional to the rate of flow of said fluid.

5. The apparatus of claim 4 wherein:
   a. said energy field generating means includes an electromagnetic wave radiator for generating an electromagnetic wave;
   b. said energy field responsive means is sensitive to electromagnetic radiation; and
   c. said moveable member is positioned in said fluid flow to interrupt said electromagnetic wave at a rate substantially proportional to the rate of flow of said fluid.

6. The apparatus of claim 4 wherein:
   a. said rotatable member includes an opaque disc having a transparent passageway therethrough;
   b. said electromagnetic wave radiator includes a light source mounted to transmit light through said passageway each time said passageway and said radiator are aligned; and
   c. said electromagnetic energy sensitive means includes a light sensitive device mounted to receive light transmitted through said passageway each time said passageway and said device are aligned.

7. The apparatus of claim 4 wherein:
   a. said metering device includes an injection pump; and
   b. said prime mover is operatively connected to said injection pump.